3,466,293
AROYLALKYL DERIVATIVES OF 1,2,3,4-TETRA-
HYDRO-5H-PYRIDO[4,3b]INDOLES
Robert Phillip Johnson, Waukegan, Ill., and John Paul
Oswald, Berkeley, Calif., assignors to Abbott Laboratories, North Chicago, Ill., a corporation of Illinois
No Drawing. Continuation-in-part of applications Ser. No. 599,747 and Ser. No. 599,748, Dec. 7, 1966. This application Apr. 3, 1968, Ser. No. 718,323
The portion of the term of the patent subsequent to May 7, 1985, has been disclaimed
Int. Cl. C07d 57/02; A61k 27/00
U.S. Cl. 260—294.9    7 Claims

ABSTRACT OF THE DISCLOSURE

2[γ-(p-fluorobenzoyl)propyl]-6,7,8, or 9-(cyano or methyl)-1,2,3,4-tetrahydro-5H-pyrido[4,3b]indoles, which are useful chemotherapeutic agents primarily through effects on the central nervous system of mammals.

This application is a continuation-in-part of United States applications Ser. Nos. 599,747, now Patent No. 3,382,250, and 599,748, both filed Dec. 7, 1966.

DETAILED DESCRIPTION

This invention relates to certain 2-aroylalkyl-1,2,3,4-tetrahydro-5H-pyrido[4,3b]indoles, their acid-addition salts, and their use as medicinal agents.

More particularly, the invention relates to compounds of the formula

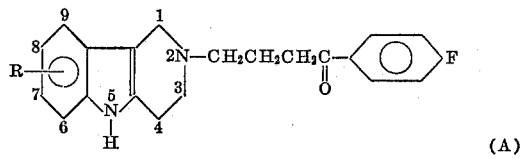

(A)

wherein R is a cyano or methyl substituent, and acid-addition salts thereof such as the hydrochloride, hydrobromide, and sulfate salts.

The compounds of this invention exhibit pharmacological activity, primarily through effects on the central nervous system of mammals, and are therefore useful chemotherapeutic agents. They are central nervous system depressants with pronounced analgesic activity. For example, they have been found to decrease the pain reflex in mice when administered orally. Specifically, the dose at which there is a 50% increase in the pain threshold ($ED_{50}$) as determined in mice by a modification of the Woolfe-MacDonald hot plate test (Eddy and Leimbach, J. Pharmacol. Exp. Therap., 1953, 107: 385–393) is as follows with reference to Formula A: the hydrobromide salt of the compounds wherein R is 8-cyano, $ED_{50}=2.7$ milligrams per kilogram (mg./kg.); the hydrochloride salt of the compound wherein R is 6-methyl, $ED_{50}=4.7$ mg./kg.; and the hydrochloride salt of the compound wherein R is 8-methyl, $ED_{50}=18.8$ mg./kg. The analgesia test employed a hot plate, the surface of which was maintained at a constant temperature. Male adult albino mice were individually dropped onto the surface of the plate confined by a bottomless beaker, and their reaction time to the warm surface was recorded. Groups of ten mice, preselected on the basis of three pretreatment control readings of 15 seconds or less, were utilized for the tests, which were conducted at 5, 15, 30, 60, and 120 minutes post-administration of the compound.

The compounds of the present invention are prepared by allowing the appropriate 1,2,3,4-tetrahydro-5H-pyrido[4,3b]indole, unsubstituted in the 2-position, to react with 4-(p-fluorophenyl)-4,4-ethylenedioxy-1-chlorobutane (the preparation of which is hereinafter described) in the presence of an acid acceptor to give the ketal derivative of compounds of Formula A. The latter may be hydrolyzed under acidic conditions to produce the corresponding desired compounds. The general reaction may be depicted as follows:

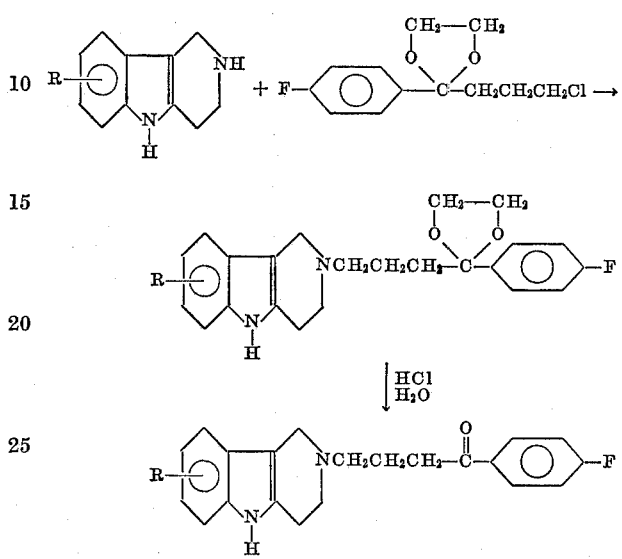

Example 1.—4-(p-fluorophenyl)-4,4-ethylenedioxy-1-chlorobutane (starting material)

In an appropriate reaction vessel are mixed 300 g. of γ-chloro-p-fluorobutyrophenone, 20 g. of p-toluenesulfonic acid hydrate, 130 g. of ethylene glycol, and 2.5 l. of benzene. This mixture is heated (stirring is optional) under reflux through an efficient water-separating device until water separation is complete (12 to 18 hours is usually sufficient). The resultant solution is cooled and washed with several portions of a 5% aqueous solution of sodium carbonate. After a final wash with saturated aqueous sodium chloride, the organic solution is dried (anhydrous magnesium sulfate is suitable), filtered, and subjected to fractional distillation under reduced pressure. The product distills at 162°–166° (15 mm.) or 144°–147° (10 mm.) with a refractive index of $$n_D{}^{25}=1.505$$

This material is sufficiently pure for use as indicated in the following examples. Further purification may be achieved by dissolving the product fraction in a volatile, water-insoluble solvent, such as diethyl ether, and washing this solution with several portions of water. The organic solution thus obtained is dried, filtered, and freed of the volatile solvent under vacuum. If desired, the produce may then be redistilled for maximum purity.

Example 2.—8-methyl-1,2,3,4-tetrahydro - 5H - pyrido
[4,3b]indole hydrochloride

In an appropriate reaction vessel, 50.0 g. (0.315 mole) of p-tolylhydrazine hydrochloride and 66.2 g. (0.314 mole) of 4,4 - diethoxypiperidine hydrochloride are slurried in 900 ml. of 2-propanol. After addition of 40 ml. of concentrated hydrochloric acid, the reaction mixture is heated under reflux for approximately three hours. The solid which precipitates from the cooled mixture is separated by filtration, washed with 2-propanol and diethyl ether, and dried. The approximately 70 g. of crude product is recrystallized from boiling water until pure white needles, melting at 269°–272°, are obtained.

Example 3.—2 - [γ - (p - fluorobenzoyl)propyl] - 8-methyl - 1,2,3,4 - tetrahydro - 5H - pyrido[4,3b]indole hydrochloride To a slurry of 30.5 g. (0.137 mole) of 8-methyl-1,2,3,4 -tetrahydro -5H - pyrido[4,3b]indole hydrochloride and 38.6 g. (0.28 mole) of potassium carbonate in 600 ml. of dimethylformamide are added 23.4 g. (0.14 mole) of potassium iodide and 42.0 g. (0.165 mole) of 1-(p-fluorophenyl)1,1-ethylenedioxy - 4 - chlorobutane (Example 1). This reaction mixture is stirred at 85°±5° for 8 hours. The solvent is removed under reduced pressure. The residue is distributed between methylene chloride and water. The organic extract is washed further with water, dried over magnesium sulfate, filtered, and freed of solvent under reduced pressure. The residue is dissolved in acetonitrile containing approximately 10% water. The solution is acidified with hydrochloric acid and heated 15–30 minutes on a steam bath. The hot solution is treated with decolorizing charcoal and filtered while hot. The filtrate, upon cooling, deposits crystals of crude product, M.P. 195°–196°. This is recrystallized from hot wet ethanol by addition of diethyl ether. The product crystallizes under these conditions as a solvate containing one mole of ethanol and melting at 205°–205.5°.

Example 4.—6 - methyl - 1,2,3,4 - tetrahydro - 5H-pyrido[4,3b]indole hydrochloride o-Tolyhydrazine hydrochloride, treated in accordance with the procedure of Example 2, produces the 6-methyl compound, M.P. 304°–310° (from methanol-water).

Example 5.—2 - [γ - (p - fluorobenzoyl)propyl] - 6-methyl-1,2,3,4 - tetrahydro - 5H - pyrido[4,3b]indole hydrochloride This compound is prepared by the procedure described in Example 3 from 6 - methyl - 1,2,3,4 - tetrahydro - 5H-pyrido[4,3b]indole hydrochloride (Example 4). The crude hydrolysis product is dissolved in aqueous methanol. The solution is treated with decolorizing charcoal and filtered hot. The hot filtrate is then diluted with 2-propanol and diethyl ether and cooled. The resultant product melts at 231°–233° with decomposition.

Example 6.—8 - cyano - 1,2,3,4 - tetrahydro - 5H-pyrido[4,3b]indole hydrochloride A mixture of 60.0 g. (0.45 mole) of p-cyanophenylhydrazine (U.S. Patent 2,511,231) and 95.0 g. (0.454 mole) of 4,4-diethoxypiperidine hydrochloride in 1500 ml. of glacial acetic acid is treated with 250 ml. of concentrated hydrochloric acid. The resultant slurry is heated under reflux approximately 5 hours with stirring. During this time, the suspended solid gradually dissolves; then the almost clear solution begins to deposit the product and ammonium chloride. This deposit is separated from the cooled reaction mixture by filtration and washed with acetic acid, then with diethyl ether. The 32 g. of crude dry product, M.P. 295°–300° (dec.), is recrysallized from aqueous alcohol, utilizing a decolorizing charcoal treatment, until the pure material is obtained, melting with decomposition at 327°–330°.

Example 7.—2 - [γ - (p - fluorobenzoyl)propyl] - 8-cyano - 1,2,3,4 - tetrahydro - 5H - pyrido[4,3b]indole hydrobromide The alkylation of 8-cyano-1,2,3,4-tetrahydro-5H-(pyrido[4,3b]indole hydrochloride (Example 6) with 1-(p-fluorophenyl)-1,1 - ethylenedioxy - 4 - chlorobutane is carried out as described in Example 2. The crude ketal free base is isolated and dissolved in 2-propanol containing 5%–10% water. This solution is acidified with aqueous hydrobromic acid and heated briefly on a steam bath. On cooling, the solution deposits fine needles. These are recrystallized several times from aqueous ethanol with decolorizing charcoal treatments. A final crysallization from a large volume of water gives the pure product, which decomposes slowly above 208°.

What is claimed is:
1. A compound of the formula

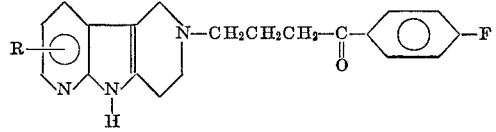

wherein R is selected from the group consisting of cyano and methyl.

2. A therapeutically acceptable acid-addition salt of the compounds of claim 1.

3. A compound as claimed in claim 1 wherein R is methyl.

4. A compound as claimed in claim 1 wherein R is cyano.

5. A compound as claimed in claim 1 wherein R is 6-methyl.

6. A compound as claimed in claim 1 wherein R is 8-methyl.

7. A compound as calimed in claim 1 wherein R is 8-cyano.

No reference cited.

HENRY R. JILES, Primary Examiner

A. L. ROTMAN, Assistant Examiner

U.S. Cl. X.R.

260—296, 340.9, 999

PO-1050
(5/69)

UNITED STATES PATENT OFFICE
CERTIFICATE OF CORRECTION

Patent No. 3,466,293        Dated September 9, 1969

Inventor(s) Robert Phillip Johnson and John Paul Oswald

It is certified that error appears in the above-identified patent and that said Letters Patent are hereby corrected as shown below:

Column 4, Claim 1, line 30 (in the formula)

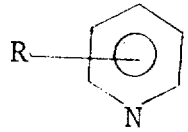      should be      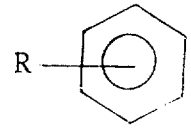

Column 4, Claim 7, line 47, "calimed" should read --claimed

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents